G. G. BUCKLAND.
BICYCLE SIDE CAR.
APPLICATION FILED AUG. 5, 1920.
1,384,300.
Patented July 12, 1921.
2 SHEETS—SHEET 1.
Fig. 1.
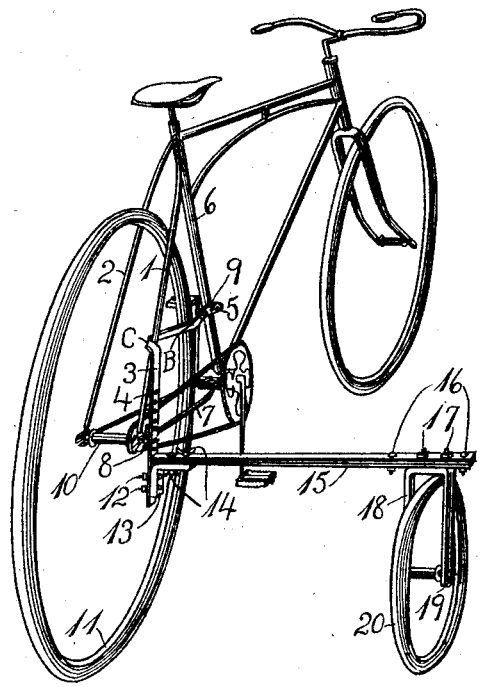
Fig. 2.
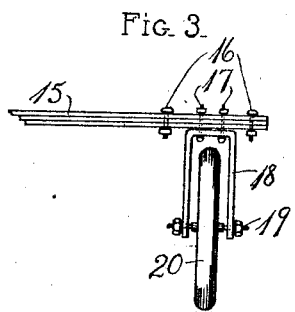
Fig. 3.
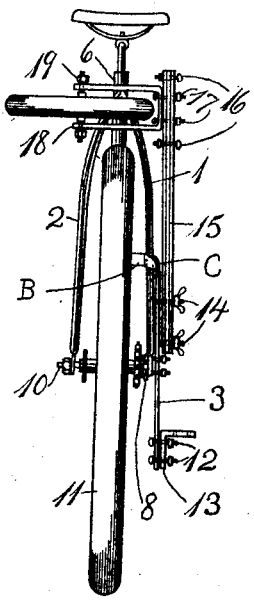
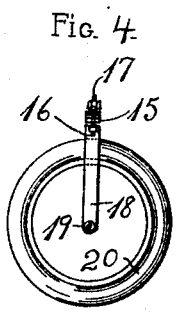
Fig. 4.
*George Gardner Buckland* INVENTOR.

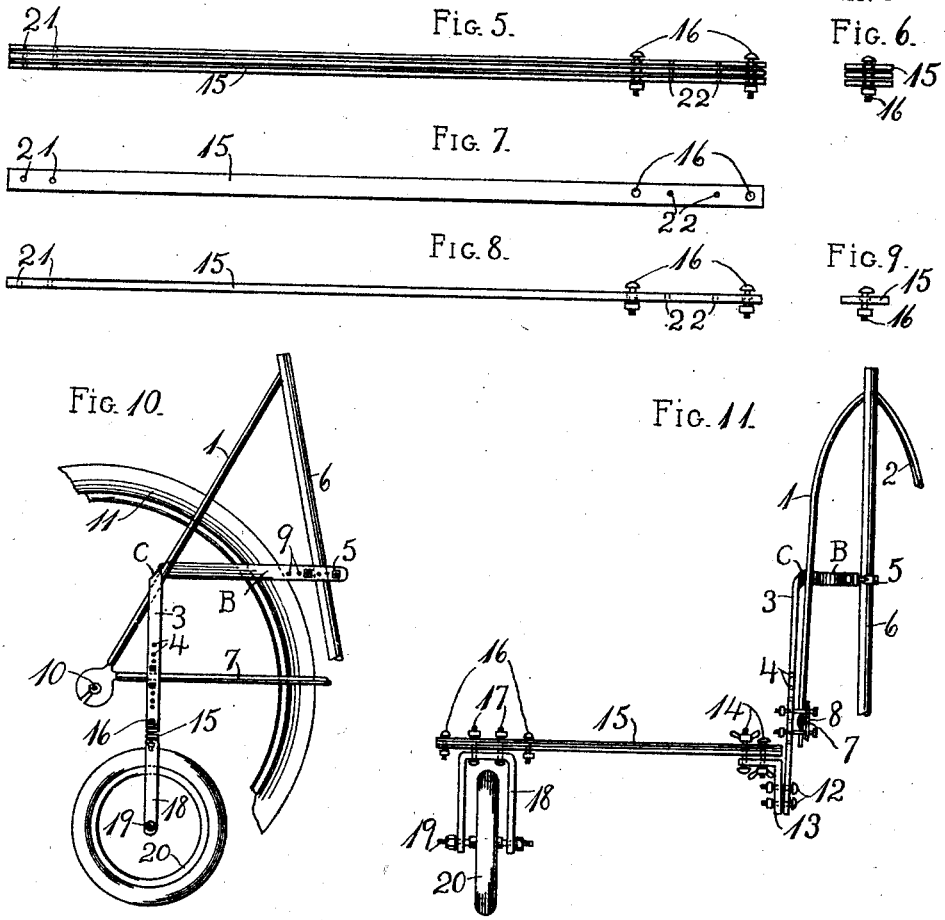

UNITED STATES PATENT OFFICE.

GEORGE GARDNER BUCKLAND, OF SAN FRANCISCO, CALIFORNIA.

BICYCLE SIDE CAR.

1,384,300.   Specification of Letters Patent.   Patented July 12, 1921.

Application filed August 5, 1920. Serial No. 401,517.

*To all whom it may concern:*

Be it known that I, GEORGE GARDNER BUCKLAND, a citizen of the United States, residing in the city and county of San Francisco and State of California, have invented new and useful Improvements in Bicycle Side Cars, of which the following is a specification.

This invention relates to vehicles and more particularly to a bicycle or motorcycle adapted for carrying parcels or boxes.

The invention consists of a side car attachment for motorcycles or bicycles having means whereby it may be readily connected to the vehicle or disconnected therefrom while at the same time its principal frame members are made of spring steel enabling the swinging of the wheels of the bicycle with the wheel of the side car in unison with the tilting action of the bicycle when rounding a corner. It also comprises two different methods of attaching the side car to the frame of the bicycle or motorcycle: one mode of attachment being at the side of the bicycle as a side car, the other being a means of attaching the side car spring bar frame in a vertical position to the bicycle frame, with the side car wheel in a horizontal position above the rear bicycle wheel where it may be used as a tandem luggage carrier. It also comprises details of construction which will be more fully explained by reference to the accompanying two sheets of drawings in which—

Figure 1 is a perspective view of the side car from the rear looking forward, as attached to a bicycle while being used as a side car.

Fig. 2 is a rear view of the side car attached to a bicycle while being used as a tandem luggage carrier.

Fig. 3 is a rear view of the side car showing the wheel, the inverted U-shaped wheel yoke and the outer end of its laminated spring bar frame.

Fig. 4 is a side view of the side car wheel and its inverted U-shaped yoke bolted to the side car spring bar frame.

Fig. 5 is a rear view of the laminated side car spring bar frame, showing the structure made up of three spring leaves.

Fig. 6 is a detail end view of the same, showing a bolt through one end.

Fig. 7 is a plan view of the side car spring bar frame.

Fig. 8 is a rear view of the side car spring bar frame showing it made up of but one leaf.

Fig. 9 is an end view of the same together with one bolt.

Fig. 10 is a right side view of the side car as attached to a bicycle, the bicycle being partly shown.

Fig. 11 is a front view of the side car attached to a bicycle, for clearness the wheels of the bicycle being omitted.

Fig. 12 is a right side view of the right angle spring attaching frame, to the lower end of which is attached the side car.

Fig. 13 is a plan view of the same.

Fig. 14 is a plan view of the front end of the right angle spring attaching frame showing the manner of rigidly clipping the same to the main bicycle frame.

Fig. 15 is a detail, looking rearwardly, showing the manner of firmly clipping the lower portion of the right-angle spring attaching frame to the lower rear bicycle fork.

The side car structure consists of a substantially U-shaped, inverted yoke 18, to the legs of which is attached the side car wheel 20, by means of bolt 19.

The inverted yoke has holes at the top for receiving bolts 17 in the straight side car spring bar frame 15. This side car spring bar frame may be made of one or more spring leaves as shown more or less in detail in Figs. 3, 5, 6, 7, 8 and 9 with bolt holes 22 in the spring bar frame for attaching it to the inverted U-shaped wheel yoke 18. Bolts 16 are for attaching any desired kind of box, body, or frame for carrying parcels, packages or a child's seat. Bolt holes 21 are for bolting the side car to the knee iron 13 by means of bolts with thumb screws 14. This knee iron is in turn bolted to the right angle spring attaching frame 3 by means of bolts 12 through holes 23. The right angle spring attaching frame 3 is intended to be practically a permanent fixture on the bicycle frame for the purpose of having a ready means of quickly attaching the side car to the bicycle or motor cycle at any desired moment, simply by using the bolts and thumb screws 14, needing only the fingers to accomplish the act; or when the side car is not needed as a side car it may be attached to the right angle spring frame 3 in a tandem upright shape as shown in Fig. 2 using the same bolts and thumb screws which attached it to the knee iron as a side car and in this position it may be used as a tandem luggage carrier and as a further reason, the rider has no further trouble of same as a side car.

The right angle spring attaching frame 3 is made of flat thin spring steel which at its approximate center C has a spiral bend to a right angle position closely and firmly enveloping on three sides the upright upper rear fork of the bicycle.

This right angle spring attaching frame being used as a means for attaching the side car proper to the bicycle by means of the various holes shown therein, holds the side car upright while at the same time alining the side car wheel with the bicycle wheels, and being made of spring steel allows a flexible movement of the bicycle when rounding corners, and this, in addition to whatever spring movement there may be in the side car spring bar frame 15: proves a comfort to the rider and also proves undue strains to the bicycle. The horizontal and vertical limbs of the right angle spring attaching frame 3 have a number of holes therein as shown at 4 and at 9 for the purpose of adjustments to fit the various sizes and kinds of bicycles to be used. Two of the holes at 4 are used when attaching the side car in tandem position.

The forward horizontal limb of the right angle spring attaching frame may be slightly bent as shown at B for the purpose of avoiding the bicycle wheel in order that the end of the frame may be clipped by means of clip 5 through holes 9 to the main bicycle post 6. In lieu of bending the frame as at B a thick washer may be interposed between the frame and bicycle post answering the same purpose. It is a self evident and very important feature of this invention that the right angle spring attaching frame 3 virtually and very simply, without any other means than its own clip attachments, converts the bicycle frame to a two fold purpose, i. e. a frame for both the bicycle and side car; it being rigidly connected to the bicycle frame at three points it follows that the bicycle wheels and the side car wheel become as a rigid three wheel vehicle maintaining the combination in an upright position of the wheels, affording a very compact and simple means of reaching the desired end of a cheap and strong side car attachment, while the feature of instantly changing the side car to a tandem luggage carrier as shown in Fig. 2 is of inestimable value in bicycle and motor cycle use.

While the drawings show the side car attached to the right side of the bicycle it is understood they apply with equal force to the left side thereof.

Having described my invention what I wish to secure by Letters Patent is—

1. A side car attachment for bicycles or motorcycles consisting of a wheel bolted within a substantially U-shaped inverted yoke, the yoke being in turn bolted to a horizontal laminated spring load carrying frame set at a right angle to the bicycle frame, the inner end of said spring frame being adjustably bolted to the vertical limb of a right angle spring attaching frame mounted within and clipped to the rear bicycle forks and frame.

2. A side car attachment for bicycles or motor cycles consisting of a right angle spring attaching frame made from spring steel, the vertical limb thereof rigidly clipped to the lower rear bicycle fork and adjustably receiving the side car frame with its wheel, the approximate center of said right angle spring attaching frame being spirally bent to a right angle, and enveloping on three sides within the spiral bend the upper rear bicycle fork while the front end of its horizontal limb is rigidly clipped to the main bicycle post.

3. The combination of a bicycle with a side car, the side car wheel being adjustably convertible to tandem position over the rear bicycle wheel, the side car structure consisting of a straight spring bar frame bolted to an inverted U-shaped wheel yoke containing therein the side car wheel, said side car spring bar for tandem purposes being adjustably bolted to the vertical member of a right angle spring attaching frame clipped on and within the bicycle frame.

In testimony whereof I have hereunto set my hand this Jan. first, 1920.

GEORGE GARDNER BUCKLAND.